United States Patent
Nakajima et al.

(10) Patent No.: US 7,821,511 B2
(45) Date of Patent: Oct. 26, 2010

(54) POWER SUPPLY VOLTAGE CONVERTING CIRCUIT, METHOD FOR CONTROLLING THE SAME, DISPLAY DEVICE, AND MOBILE TERMINAL

(75) Inventors: Yoshiharu Nakajima, Kanagawa (JP); Yoshitoshi Kida, Kanagawa (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 10/557,799

(22) PCT Filed: May 14, 2004

(86) PCT No.: PCT/JP2004/006906

§ 371 (c)(1), (2), (4) Date: Nov. 18, 2005

(87) PCT Pub. No.: WO2004/105221

PCT Pub. Date: Dec. 2, 2004

(65) Prior Publication Data

US 2007/0057898 A1    Mar. 15, 2007

(30) Foreign Application Priority Data

May 20, 2003 (JP) .............................. 2003-141603

(51) Int. Cl.
G09G 5/00 (2006.01)
(52) U.S. Cl. ................. 345/211; 345/210; 345/204
(58) Field of Classification Search ............... 345/210, 345/211, 204
See application file for complete search history.

(56) References Cited

U.S. PATENT DOCUMENTS

| | | | |
|---|---|---|---|
| 4,807,104 A | 2/1989 | Floyd et al. | |
| 5,870,295 A * | 2/1999 | Watanabe | 363/60 |
| 6,160,723 A * | 12/2000 | Liu | 363/60 |
| 6,177,824 B1 * | 1/2001 | Amanai | 327/333 |
| 6,278,625 B1 * | 8/2001 | Boyd | 363/132 |
| 6,304,256 B1 * | 10/2001 | Nagaya | 345/211 |
| 6,421,034 B1 * | 7/2002 | Mihara | 345/76 |
| 6,456,344 B1 * | 9/2002 | Nemoto et al. | 349/64 |
| 6,509,895 B2 * | 1/2003 | Yanagi et al. | 345/211 |
| 6,727,681 B2 * | 4/2004 | Morita | 323/282 |
| 7,224,336 B2 * | 5/2007 | Katsutani | 345/87 |
| 2001/0020939 A1 * | 9/2001 | Ikeda | 345/211 |

(Continued)

FOREIGN PATENT DOCUMENTS

EP    1 233 504    8/2002

(Continued)

*Primary Examiner*—Amare Mengistu
*Assistant Examiner*—Premal Patel
(74) *Attorney, Agent, or Firm*—Oblon, Spivak, McClelland, Maier & Neustadt, L.L.P.

(57) ABSTRACT

A supply voltage conversion circuit allowing fabrication of a charge pump circuit having a large current capability with a small area is provided. In a charge pump DC-DC converter (10) for converting a supply voltage VDD1 to a supply voltage VDD2, a level shifter (12) implements amplitude conversion to convert from a control pulse with amplitude of VSS-VDD1 to a control pulse with amplitude of VSS-VDD2. By using the control pulse having the converted amplitude as a pumping pulse, a flying capacitor (C11) is charged/discharged by MOS transistors (Qp11), and (Qn11) of a charge pump circuit (11), and switching of MOS transistors (Qn12), and (Qp12) coupled to the output of the flying capacitor (C11) is controlled.

14 Claims, 8 Drawing Sheets

U.S. PATENT DOCUMENTS

| | | | |
|---|---|---|---|
| 2002/0011883 A1* | 1/2002 | Yamazaki et al. | 327/143 |
| 2002/0018060 A1* | 2/2002 | Yamazaki et al. | 345/211 |
| 2002/0130704 A1 | 9/2002 | Myono et al. | |
| 2003/0011586 A1* | 1/2003 | Nakajima | 345/211 |
| 2003/0067289 A1 | 4/2003 | Morita | |
| 2003/0107356 A1* | 6/2003 | Hachiya | 323/282 |

FOREIGN PATENT DOCUMENTS

| | | |
|---|---|---|
| EP | 1 304 791 | 4/2003 |
| JP | 64-40071 | 3/1989 |
| JP | 40071/1989 | 3/1989 |
| JP | 2001-245468 | 7/2001 |
| JP | 2001-245468 | 9/2001 |
| JP | 2002-175027 | 6/2002 |
| JP | 2002-233133 | 8/2002 |
| JP | 2002-233134 | 8/2002 |
| JP | 2003-102165 | 4/2003 |

* cited by examiner

POWER SUPPLY VOLTAGE CONVERTING CIRCUIT, METHOD FOR CONTROLLING THE SAME, DISPLAY DEVICE, AND MOBILE TERMINAL

TECHNICAL FIELD

The present invention relates to a supply voltage conversion circuit, a control method thereof, a display and a portable terminal, and particularly to a supply voltage conversion circuit employing a charge pump circuit that charges/discharges a capacitor, a control method thereof, a display having the supply voltage conversion circuit, and a portable terminal typified by a cellular phone employing the display as its screen display part.

BACKGROUND ART

In recent years, spread of portable terminals, such as cellular phones and PDAs (Personal Digital Assistants; portable information terminals), have been remarkable. One factor of the rapid spread of these portable terminals is, for example, liquid crystal displays included as a screen display part of the portable terminals. The reason for this is that the liquid crystal displays are display devices that have a characteristic of requiring no power for driving themselves in principle, and therefore are of low power consumption.

The portable terminal employs as its power supply a battery of a single supply voltage. In contrast, in the liquid crystal display, a horizontal drive circuit for driving pixels arranged in rows and columns employs DC voltages that are different between a logic part and an analog part thereof. Furthermore, a vertical drive circuit for writing information to the pixels employs a DC voltage having the absolute value larger than that of the voltages for the horizontal drive circuit. Therefore, used for the liquid crystal display included in the portable terminal is a supply voltage conversion circuit that converts a single DC voltage to plural kinds of DC voltages having different magnitudes, a so-called DC-DC converter.

Conventionally, DC-DC converters employing an inductor are typically used for liquid crystal displays. However, due to recent trends of portable terminals toward lower power consumption and smaller size, use of charge pump DC-DC converters has been increasing (for example, refer to Japanese Patent Laid-open No. 2002-176764 (in particular, paragraphs 0005 to 0013 and FIGS. 11 to 14)). The charge pump DC-DC converter has an advantage of contributing to miniaturization of the portable terminal since it eliminates a need to use an inductor as an external part, although the current capacity thereof is comparatively small.

In a conventional charge pump DC-DC converter, the gate voltage of a transistor for driving a flying capacitor is controlled by changing its voltage swing controlled by the input voltage. Therefore, when realization of a DC-DC converter of large current capacitance is aimed, large size transistors need to be formed, which leads to a large circuit size. This circuit size increase is problematically significant when the circuits are fabricated using devices having comparatively small mobility such as low-temperature poly-silicon TFT (Thin Film Transistor), which are formed on an insulating substrate. Specifically, when forming a charge pump DC-DC converter on a so-called frame (peripheral region of a display area part) of a display integrally with the display area part (pixel part), the increase of circuit size of the DC-DC converter causes the increase of the frame size. Therefore, a serious problem arises when miniaturization of a display is aimed.

The present invention is made in consideration of the above-described problem, and a desire thereof is to provide a supply voltage conversion circuit allowing fabrication of a charge pump circuit having large current capability with a small area, a control method thereof, a display including the supply voltage conversion circuit, and a portable terminal employing the display as its screen display part.

DISCLOSURE OF INVENTION

In order to achieve the above-described desire, according to the present invention, in a supply voltage conversion circuit employing a charge pump circuit that includes a capacitor and a pair of transistors for charging/discharging the capacitor and converts a first supply voltage to a second supply voltage that is larger than the first supply voltage, the amplitude of a control pulse is converted by using the second supply voltage resulting from conversion by the charge pump circuit, and then the capacitor is charged/discharged with the pair of transistors by using the control pulse having the converted amplitude. Furthermore, the supply voltage conversion circuit is used as a power supply circuit of a display. In addition, a display including the supply voltage conversion circuit is used as a screen display part of a portable terminal.

In the supply voltage conversion circuit with the above-described configuration, amplitude conversion is implemented to convert from the control pulse with amplitude corresponding to the first supply voltage to the control pulse with amplitude corresponding to the second supply voltage. The control pulse having the converted amplitude is then applied to the pair of transistors for charging/discharging the capacitor. Thus, the voltages between the gate and source of the pair of transistors are increased. Accordingly, the on-resistance of the transistor pair is decreased, and therefore the transistor sizes of the transistor pair can be decreased. As a result, a supply voltage conversion circuit having a large current capability can be achieved with a small circuit scale.

BEST MODE FOR CARRYING OUT THE INVENTION

Embodiments of the present invention will be described in detail below with reference to the drawings.

First Embodiment

Figure 1:
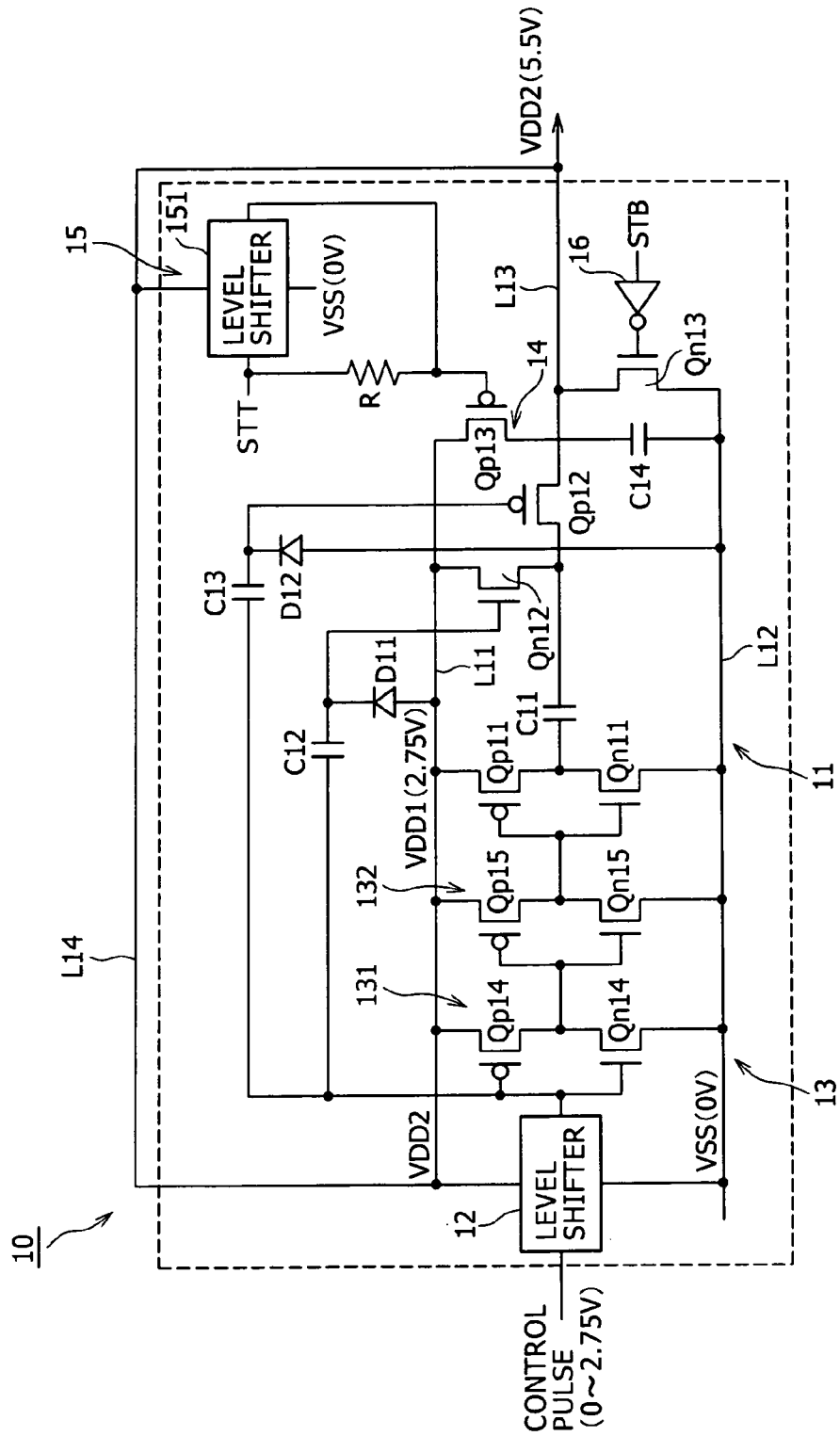
FIG. 1 is a circuit diagram illustrating an example of the configuration of a charge pump DC-DC converter according to a first embodiment of the present invention.

FIG. 1 is a circuit diagram illustrating an example of the configuration of a DC voltage conversion circuit, i.e., a charge pump DC-DC converter, according to a first embodiment of the present invention. Here, as one example, description will be made about a DC-DC converter supplied with a first positive supply voltage VDD1 of 2.75 V and a negative supply voltage VSS of 0 V (ground level), and boosting the first positive supply voltage VDD1 to twice the voltage VDD1, i.e., to a second positive supply voltage VDD2 of 5.5 V.

As is apparent from FIG. 1, a DC-DC converter 10 according to the present embodiment includes a charge pump circuit 11, a level shifter 12, a buffer 13, a switch element 14 and a power supply start-up control circuit 15. The charge pump circuit 11 includes a flying capacitor C11 and a pair of transistors for charging/discharging the flying capacitor C11, i.e., a PchMOS transistor Qp11 and an NchMOS transistor Qn11. The PchMOS transistor Qp11 is connected between one end of the flying capacitor C11 and a power supply line L11 for the first positive supply voltage VDD1, and the NchMOS transistor Qn11 is connected between the one end of the flying capacitor C11 and a power supply line L12 for the negative supply voltage VSS.

In the charge pump circuit 11, an NchMOS transistor Qn12, which is a switching transistor, is connected between the other end of the flying capacitor C11 and the power supply line L11. In addition, a PchMOS transistor Qp12, which is a switching transistor, is connected between the other end of the flying capacitor C11 and an output line L13. The output line L13 is a line for outputting the second positive supply voltage VDD2.

The gate of the MOS transistor Qn12 is connected to the cathode of a diode D11. The anode of the diode D11 is connected to the power supply line L11. The gate of the MOS transistor Qp12 is connected to the cathode of a diode D12. The anode of the diode D12 is connected to the power supply line L12. Connected between the output line L13 and the power supply line L12 are a capacitor C14 and an NchMOS transistor Qn13. The gate of the MOS transistor Qn13 is supplied with a standby pulse STB via an inverter 16.

The level shifter 12 is an amplitude conversion circuit that employs as its operating voltage the second positive supply voltage VDD2 supplied via a power supply line L14 and the negative supply voltage VSS, and converts a control pulse (pumping pulse) having amplitude of VSS (0 V)-VDD1 (2.75 V) to a control pulse having amplitude of VSS-VDD2 (5.5 V). The control pulse with amplitude of VSS-VDD2, which results from the amplitude conversion by the level shifter 12, is supplied via the buffer 13 to each of the gates of the MOS transistors Qp11 and Qn11, and is supplied via the capacitors C12 and C13 to the gates of the MOS transistors Qn12 and Qp12, respectively.

Figure 2:
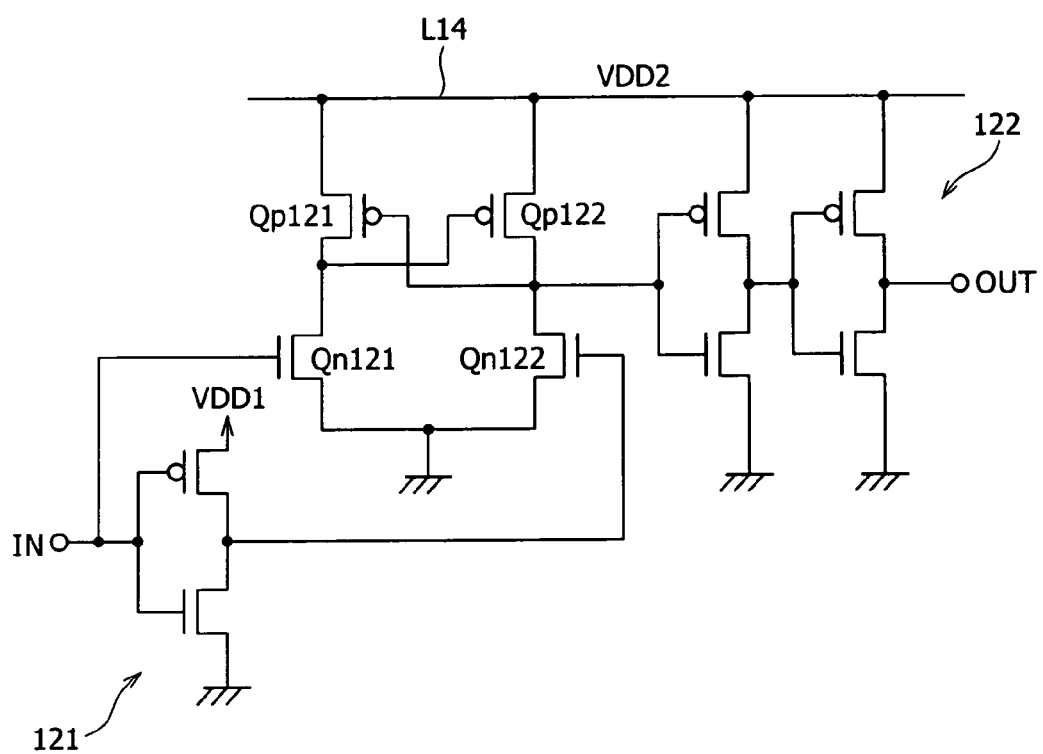
FIG. 2 is a circuit diagram illustrating one example of the specific configuration of a level shifter.

FIG. 2 is a circuit diagram illustrating one example of the specific configuration of the level shifter 12. The level shifter 12 of the present example has NchMOS transistors Qn121 and Qn122 whose sources are both grounded, and has a differential circuit configuration in which the drains of the MOS transistors Qn121 and Qn122 are cross-coupled. Specifically, the drains of the MOS transistors Qn121 and Qn122 are connected via PchMOS transistors Qp121 and Qp122 to the power supply line L14 for the second positive supply voltage VDD2. The gates of the MOS transistor Qp121 and Qp122 are connected to the drains of the MOS transistors Qn122 and Qn121, respectively.

The gate of the MOS transistor Qn121 is supplied with the control pulse with amplitude of VSS-VDD1, and the gate of the MOS transistor Qn122 is supplied with the control pulse with amplitude of VSS-VDD1 inverted by a CMOS inverter 121. Thus, amplitude conversion is implemented to convert from the control pulse with amplitude of VSS-VDD1 to the control pulse with amplitude of VSS-VDD2, which is derived from the drain of the MOS transistor Qn122. The control pulse with amplitude of VSS-VDD2 is output via a buffer 122 composed of cascaded two stages of CMOS inverters.

Referring again to FIG. 1, the buffer 13 is configured by cascading two CMOS inverters 131 and 132. The CMOS inverter 131 is composed of a PchMOS transistor Qp14 and an NchMOS transistor Qn14 that are connected in series between the power supply line L14 for the positive supply voltage VDD2 and the power supply line L12 for the negative supply voltage VSS, and have gates connected to each other. The CMOS inverter 132 is composed of a PchMOS transistor Qp15 and an NchMOS transistor Qn15 that are connected in series between the power supply lines L14 and L12, and have gates connected to each other.

The switch element 14 is provided in order to couple the output line L13 to the power supply line L11 for the first positive supply voltage VDD1 during a certain period at the time of power-up. The switch element 14 is made up of a PchMOS transistor Qp13 connected between the power supply line L11 and the output line L13. To the gate of the PchMOS transistor Qp13, a power supply start-up control pulse STT is applied via the power supply start-up control circuit 15 at the time of power-up.

The power supply start-up control circuit 15 is provided in order to surely turn on the switch element 14 at the time of power-up, and to surely turn off the switch element 14 after the second positive supply voltage VDD2 has been activated. The power supply start-up control circuit 15 includes a resistance element R and a level shifter 151 connected in parallel with the resistance element R. The resistance element R directly supplies the power supply start-up control pulse STT to the gate of the MOS transistor Qp13. The level shifter 151 implements a level shift to convert from the power supply start-up control pulse STT with amplitude of VSS-VDD1 to the power supply start-up control pulse STT with amplitude of VSS-VDD2. As the level shifter 151, one having the circuit configuration shown in FIG. 2 can be used for example.

Figure 3:
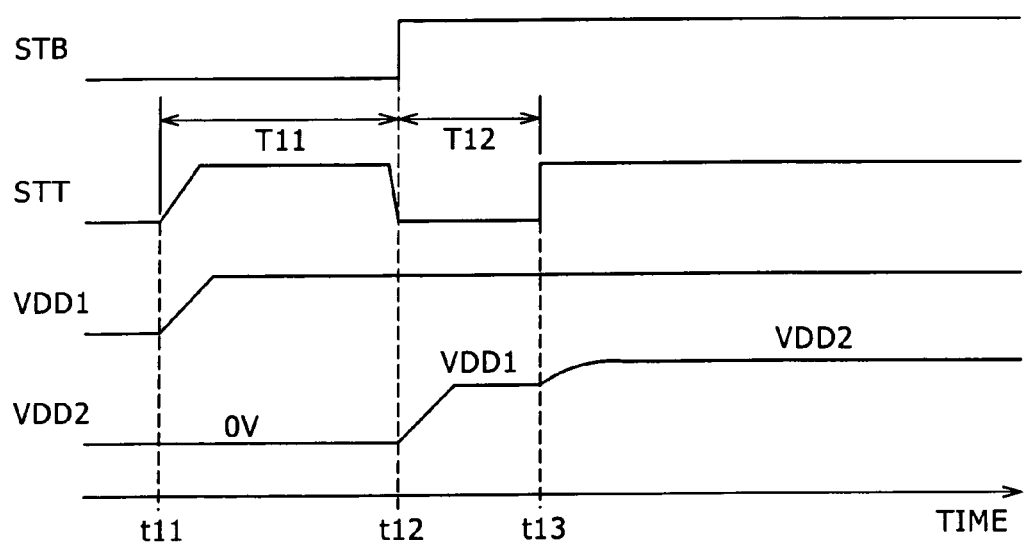
FIG. 3 is a timing chart explaining the circuit operation of the charge pump DC-DC converter according to the first embodiment at the time of power-up thereof.

The circuit operation of the charge pump DC-DC converter 10, at the time of power-up thereof, according to the first embodiment with the above-described configuration will be described below with reference to the timing chart of FIG. 3.

Upon power-up at time t11, initially the first positive supply voltage VDD1 and the power supply start-up control pulse STT are activated. During a certain period T11 from the activation to time t12, the standby pulse STB is at the low level (ground level), and therefore the MOS transistor Qn13 is in the on-state. Thus, charges of the capacitor C14 are discharged. At the time t12, the standby pulse STB is switched to the high level (VCC1), which turns off the MOS transistor Qn13.

In addition, from the time t12, the power supply start-up control pulse STT is kept at the low level during a certain period T12, and is applied via the resistance element R to the gate of the MOS transistor Qp13, which is the switch element 14. Thus, the MOS transistor Qp13 enters the on-state, which couples the output line L13 to the power supply line L11.

Therefore, the first positive supply voltage VDD1 is output from the output line L13 initially. The positive supply voltage VDD1 is also supplied to the level shifter 12 via the power supply line L14.

The level shifter 12 initializes its operation with the positive supply voltage VDD1 as the supply voltage, and supplies the control pulse with amplitude of VSS-VDD1 as a pumping pulse directly to the charge pump circuit 11 via the buffer 13. Upon receiving the control pulse, the charge pump circuit 11 initializes boosting operation (pumping operation) according to the control pulse. Subsequently, at time t13, after the elapse of the certain period T12, the power supply start-up control pulse STT is turned to the high level and thus the MOS transistor Qp13 is turned off. Thus, the boosting operation by the charge pump circuit 11 gradually raises the potential of the output line L13 from the VDD1 level, and ultimately the potential converges on the VDD2 level.

The second positive supply voltage VDD2 is supplied via the power supply line L14 to the level shifters 12 and 151. Consequently, the level shifter 12 implements amplitude conversion (level shift) to convert from the control pulse with amplitude of VSS-VDD1 to the control pulse with amplitude of VSS-VDD2, and supplies the converted pulse to the charge pump circuit 11. Similarly, the level shifter 151 implements amplitude conversion to convert from the power supply start-up control pulse STT with amplitude of VSS-VDD1 (logic level) to the power supply start-up control pulse STT with amplitude of VSS-VDD2, and supplies the converted pulse to the gate of the MOS transistor Qp13.

As described above, in the charge pump DC-DC converter 10 that converts the supply voltage VDD1 to the supply voltage VDD2 according to the first embodiment, amplitude conversion is implemented to convert from the control pulse with amplitude of VSS-VDD1 to the control pulse with amplitude of VSS-VDD2. Subsequently, by use of the control pulse having the converted amplitude as a pumping pulse, the flying capacitor C11 is driven by the MOS transistors Qp11 and Qn11, and switching of the MOS transistors Qn12 and Qp12 connected to the output of the flying capacitor C11 is controlled. Thus, the voltages between the gate and source of the MOS transistors Qp11, Qn11, Qn12 and Qp12 become larger compared with the case of implementing drive control with the control pulse with amplitude of VSS-VDD1. In this example, the voltages become twice as large.

Thus, the on-resistance of the MOS transistors Qp11, Qn11, Qn12 and Qp12 is lowered. Accordingly, the sizes of these MOS transistors can be decreased, and therefore the formation areas of the MOS transistors Qp11, Qn11, Qn12 and Qp12 can be reduced. As a result, the charge pump circuit 11 having a large current capability can be achieved with a small circuit scale. This advantage is significant particularly when transistors having large threshold values Vth, e.g., thin film transistors, are used as the MOS transistors Qp11, Qn11, Qn12 and Qp12.

In addition, at the time of power-up, the MOS transistor Qp13, which is the switch element 14, couples the output line L13 to the power supply line L11 for the voltage VDD1 to thereby output the first positive supply voltage VDD1 from the output line L13. Thus, the supply voltage VDD1 is also supplied via the power supply line L14 to the level shifter 12. Therefore, the level shifter 12 can be operated normally also at the time of power supply start-up, which allowing stable start-up operation.

Specifically, the level shifter 12, which operates with the second positive supply voltage VDD2 originally, cannot operate normally at the time of power supply start-up since the supply voltage VDD2 has not been activated yet. Therefore, the control pulse cannot be supplied to the charge pump circuit 11. In contrast to this, by coupling the output line L13 to the power supply line L11 at the time of power-up, the supply voltage VDD1 is supplied to the level shifter 12. Therefore, the level shifter 12 operates normally also at the time of power supply start-up, which allows normal supply of the control pulse to the charge pump circuit 11.

The power supply start-up control pulse STT, which controls on/off of the MOS transistor Qp13, needs to control the potential of the output line L12, and therefore needs to have the same voltage value as the potential of the output line L12. However, at the stage before the MOS transistor Qp13 is turned on at the time of power supply start-up, this voltage value cannot be ensured sufficiently. Consequently, at the time of power supply start-up, the power supply start-up control pulse STT at the logic level is applied via the resistance element R to the gate of the MOS transistor Qp13. Furthermore, after the second positive supply voltage VDD2 has been activated, the power supply start-up control pulse STT resulting from the level shift by the level shifter 151 is applied to the gate of the MOS transistor Qp13 to thereby control switching of the MOS transistor Qp13. Thus, stable start-up operation is allowed.

Although the present embodiment has been described by taking as an example the charge pump DC-DC converter 10 that converts the first positive supply voltage VDD1 to the second positive supply voltage VDD2 larger than the voltage VDD1 (boosts to twice the voltage VDD1, in this example), the invention is not limited thereto. The invention can similarly be applied to a charge pump DC-DC converter that converts (by a factor of minus one) the first positive supply voltage VDD1 to a second negative supply voltage VSS2 (e.g., −2.75 V) (refer to a second embodiment to be described below). In addition, it is obvious that the invention is not limited to a charge pump DC-DC converter that converts a supply voltage to twice the voltage or by a factor of minus one.

Second Embodiment

Figure 4:
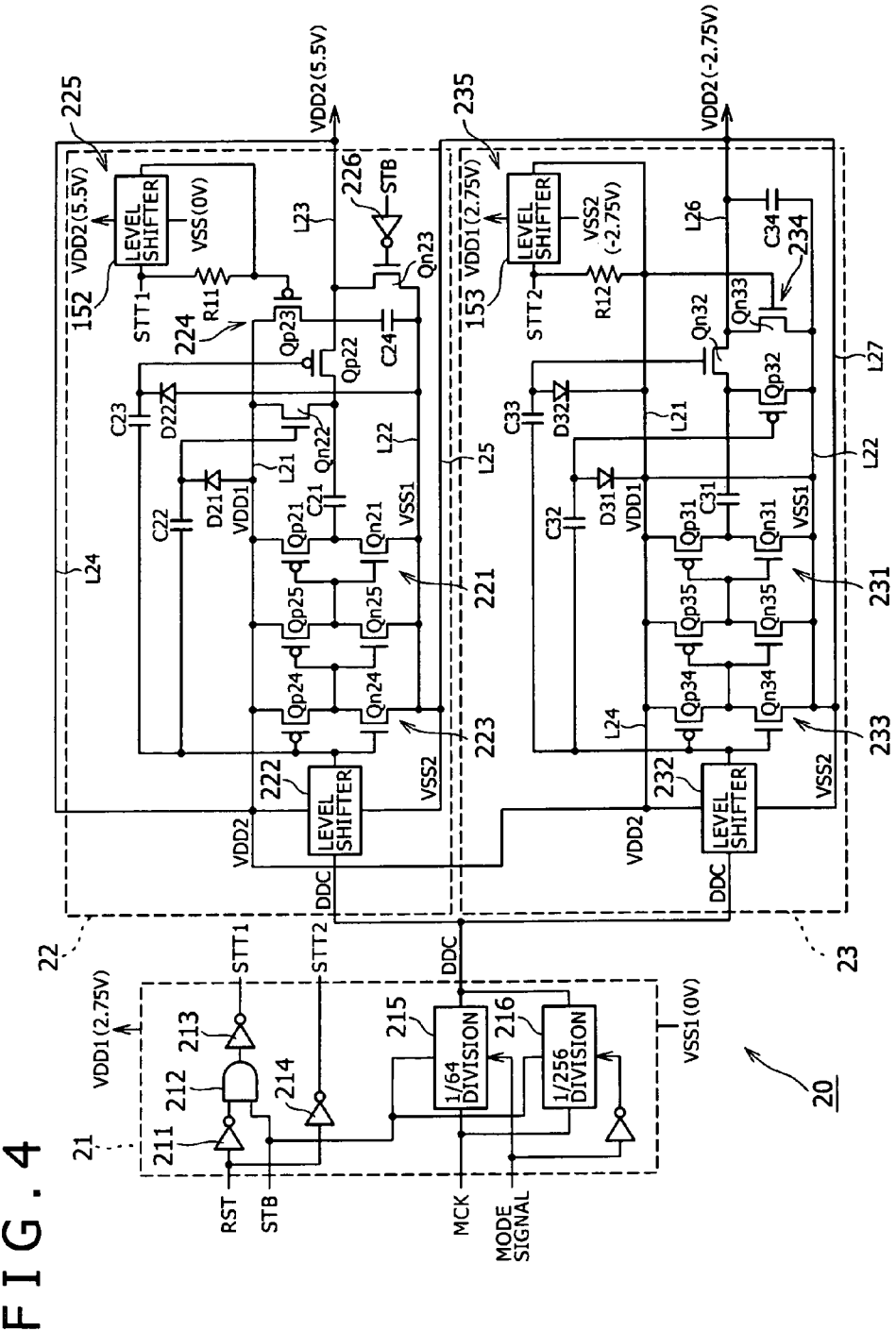
FIG. 4 is a circuit diagram illustrating an example of the configuration of a charge pump DC-DC converter according to a second embodiment of the present invention.

FIG. 4 is a circuit diagram illustrating an example of the configuration of a DC voltage conversion circuit, i.e., a charge pump DC-DC converter, according to a second embodiment of the present invention. Here, as one example, description will be made about a DC-DC converter supplied with a first positive supply voltage VDD1 of 2.75 V and a first negative supply voltage VSS1 of 0 V (ground level), and boosting the first positive supply voltage VDD1 to a second positive supply voltage VDD2 of 5.5 V (boosting to twice the voltage VDD1) and converting the voltage VDD1 to a second negative supply voltage VSS2 of −2.75 V (converting by a factor of minus one).

As is apparent from FIG. 4, a DC-DC converter 20 according to the present embodiment is composed of three blocks: control circuit unit 21, 5.5 V generation circuit unit 22, and −2.75 V generation circuit unit 23. The control circuit unit 21 employs the positive supply voltage VDD1, which is the logic level voltage, and the negative supply voltage VSS1 as its operating voltage to thereby generate two power supply start-up control pulses STT1 and STT2 based on a reset pulse RST and a standby pulse STB, and generate a control pulse DDC to serve as a pumping pulse based on the standby pulse STB, a master clock MCK and a mode signal.

In the control circuit unit 21, the reset pulse RST is inverted by an inverter 211 to be supplied to one input of an AND gate 212. The standby pulse STB is directly supplied to the other input of the AND gate 212. The AND gate 212 takes the AND of the both inputs. An output pulse from the AND gate 212 is inverted by an inverter 213 to become the power supply start-up control pulse STT1. In addition, the reset pulse RST is inverted by an inverter 214 to become the power supply start-up control pulse STT2.

The control circuit unit 21 is further provided with a divide-by-64 frequency divider 215 that 1/64-divides the master clock MCK, for example, and a divide-by-256 frequency divider 216 that 1/256-divides the master clock MCK, for example. The divide-by-64 frequency divider 215 enters the operation state when the mode signal is at the high level (H=normal mode), and generates the control pulse DDC resulting from the 1/64 frequency division of the master clock MCK. The divide-by-256 frequency divider 216 enters the operation state when the mode signal is at the low level (L=low power mode), and generates the control pulse DDC resulting from the 1/256 frequency division of the master clock MCK.

The control pulse DDC thus generated is commonly used in the 5.5 V generation circuit unit 22 and the 2.75 V generation circuit unit 23. Note that the 5.5 V generation circuit unit 22 and the −2.75 V generation circuit unit 23 do not necessarily need to use the control pulses DDC having the same frequency, but may use the control pulses DDC having different frequencies.

In addition, although this example generates the control pulses DDC with frequencies obtained by 1/64-dividing the master clock MCK in the normal mode, and 1/256-dividing it in the low power mode, the frequencies are not limited thereto. The control pulse DDC with any frequency is available as long as a necessary power capability is ensured. Furthermore, two power supply start-up control pulses STT1 and STT2 may be generated at another place in the system.

The 5.5 V generation circuit unit 22 includes a charge pump circuit 221, a level shifter 222, a buffer 223, a switch element 224, and a power supply start-up control circuit 225. The charge pump circuit 221 includes a flying capacitor C21 and a pair of transistors, i.e., a PchMOS transistor Qp21 and an NchMOS transistor Qn21. The PchMOS transistor Qp21 is connected between one end of the flying capacitor C21 and a power supply line L21 for the voltage VDD1, and the NchMOS transistor Qn21 is connected between the one end of the flying capacitor C21 and a power supply line L22 for the voltage VSS1.

In the charge pump circuit 221, an NchMOS transistor Qn22, which is a switching transistor, is connected between the other end of the flying capacitor C21 and the power supply line L21. In addition, a PchMOS transistor Qp22, which is a switching transistor, is connected between the other end of the flying capacitor C21 and an output line L23. The output line L23 is a line for outputting the second positive supply voltage VDD2.

The gate of the MOS transistor Qn22 is connected to the cathode of a diode D21. The anode of the diode D21 is connected to the power supply line L21. The gate of the MOS transistor Qp22 is connected to the cathode of a diode D22. The anode of the diode D22 is connected to the power supply line L22. Connected between the output line L23 and the power supply line L22 are a capacitor C24 and an NchMOS transistor Qn23. The gate of the MOS transistor Qn23 is supplied with the above-described standby pulse STB via an inverter 226.

The level shifter 222 is an amplitude conversion circuit that employs as its operating voltage, the second positive supply voltage VDD2 supplied via a power supply line L24 and the second negative supply voltage VSS2 supplied from the −2.75 V generation circuit unit 23 via a power supply line L25. The level shifter 222 converts a control pulse (pumping pulse) having amplitude of VSS1 (0 V)-VDD1 (2.75 V) to a control pulse having amplitude of VSS2 (−2.75 V)-VDD2 (5.5 V). The control pulse DDC with amplitude of VSS2-VDD2, which results from the amplitude conversion by the level shifter 222, is supplied via the buffer 223 to each of the gates of the MOS transistors Qp21 and Qn21, and is supplied via the capacitors C22 and C23 to the gates of the MOS transistors Qn22 and Qp22, respectively.

Figure 5:
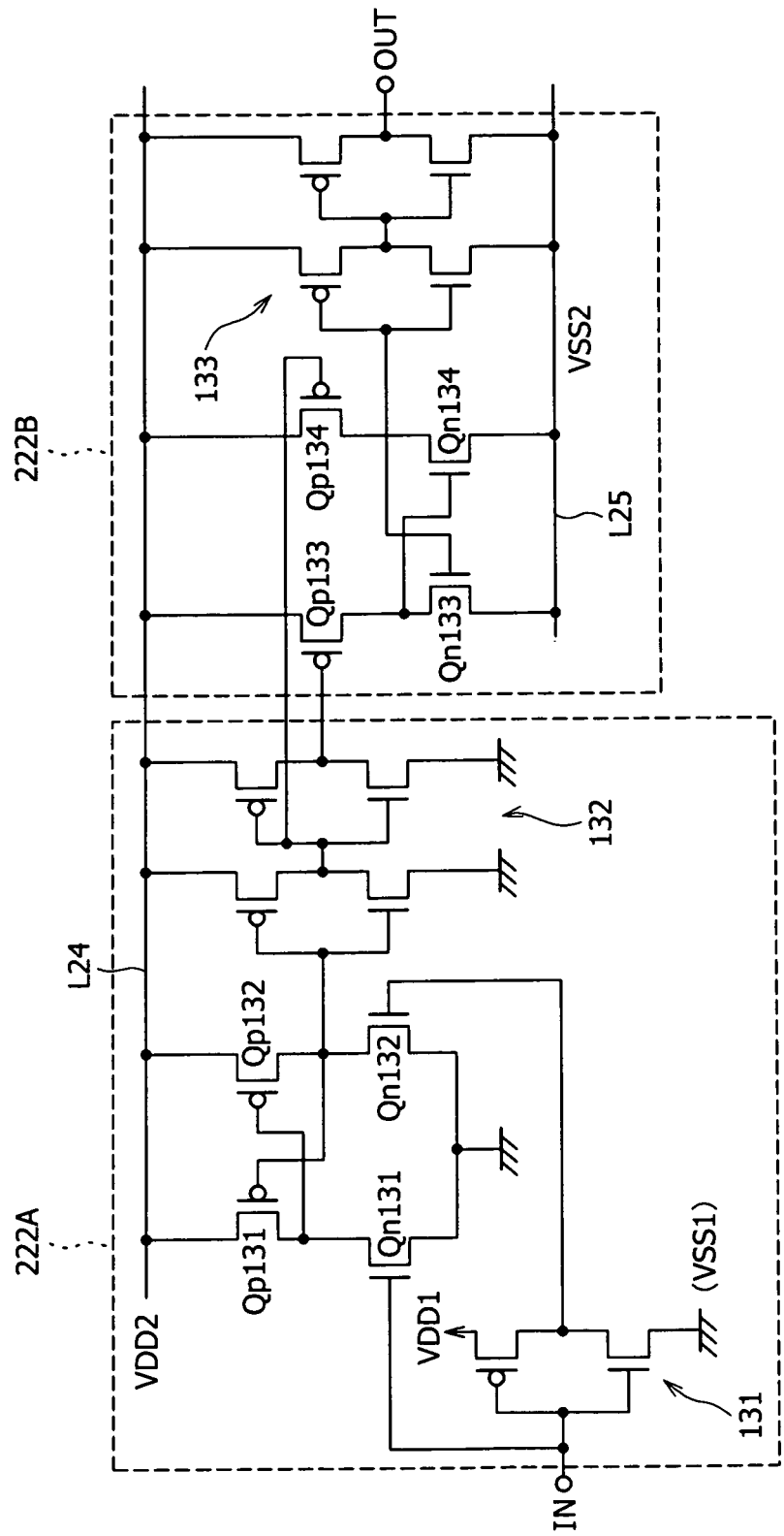
FIG. 5 is a circuit diagram illustrating another example of the specific configuration of a level shifter.

FIG. 5 is a circuit diagram illustrating one example of the specific configuration of the level shifter 222. The level shifter 222 according to the present example is composed of a circuit part 222A and a circuit part 222B. The circuit part 222A initially implements amplitude conversion to convert from the control pulse DDC with amplitude of VSS1-VDD1 to the control pulse DDC with amplitude of VSS1-VDD2. The circuit part 222B then implements amplitude conversion to convert from the control pulse DDC with amplitude of VSS1-VDD2 to the control pulse DDC with amplitude of VSS2-VDD2.

The circuit part 222A has NchMOS transistors Qn131 and Qn132 whose sources are both grounded, and has a differential circuit configuration in which the drains of the MOS transistors Qn131 and Qn132 are cross-coupled. Specifically, the drains of the MOS transistors Qn131 and Qn132 are connected via PchMOS transistors Qp131 and Qp132 to the power supply line L24 for the voltage VDD2. The gates of the MOS transistor Qp131 and Qp132 are connected to the drains of the MOS transistors Qn132 and Qn131, respectively.

The gate of the MOS transistor Qn131 is supplied with the control pulse with amplitude of VSS1-VDD1, and the gate of the MOS transistor Qn132 is supplied with the control pulse with amplitude of VSS1-VDD1 inverted by a CMOS inverter 131. Thus, amplitude conversion is implemented to convert from the control pulse with amplitude of VSS1-VDD1 to the control pulse with amplitude of VSS1-VDD2, which is derived from the drain of the MOS transistor Qn132. The control pulse with amplitude of VSS1-VDD2 passes through a buffer 132 composed of cascaded two stages of CMOS inverters, so as to be supplied to the circuit part 222B as pulses having opposite phases.

The circuit part 222B has PchMOS transistors Qp133 and Qp134 whose sources are both connected to the power supply line L24 for the voltage VDD2, and has a differential circuit configuration in which the drains of the MOS transistors Qp133 and Qp134 are cross-coupled. Specifically, the drains of the MOS transistors Qp133 and Qp134 are connected via NchMOS transistors Qn133 and Qn134 to the power supply line L25 for the voltage VSS2. The gates of the MOS transistor Qn133 and Qn134 are connected to the drains of the MOS transistors Qp134 and Qp133, respectively.

The gates of the MOS transistors Qp133 and Qp134 are supplied with the control pulses with amplitude of VSS1-VDD2 having opposite phases. Thus, amplitude conversion is implemented to convert from the control pulse with amplitude of VSS1-VDD2 to the control pulse with amplitude of VSS2-VDD2, which is derived from the drain of the MOS transistor Qp134. The control pulse with amplitude of VSS2-VDD2 is output via a buffer 133 composed of cascaded two stages of CMOS inverters.

Referring again to FIG. 4, the buffer 223 is composed of two cascaded CMOS inverters. One inverter is composed of a PchMOS transistor Qp24 and an NchMOS transistor Qn24 that are connected in series between the power supply line L24 for the voltage VDD2 and the power supply line L25 for the voltage VSS2, and have gates connected to each other. The other inverter is composed of a PchMOS transistor Qp25 and an NchMOS transistor Qn25 that are connected in series between the power supply lines L24 and L25, and have gates connected to each other.

The switch element 224 is provided in order to couple the output line L23 to the power supply line L21 for the voltage VDD1 during a certain period at the time of power-up. The switch element 224 is made up of a PchMOS transistor Qp23 connected between the power supply line L21 and the output line L23. To the gate of the MOS transistor Qp23, the above-described power supply start-up control pulse STT1 is applied via the power supply start-up control circuit 225 at the time of power-up.

The power supply start-up control circuit 225 is provided in order to surely turn on the switch element 224 at the time of power-up, and to surely turn off the switch element 224 after the supply voltage VDD2 has been activated. The power supply start-up control circuit 225 includes a resistance element R11 and a level shifter 152 connected in parallel with the resistance element R11. The resistance element R11 directly supplies the power supply start-up control pulse STT1 to the gate of the MOS transistor Qp23. The level shifter 152 implements a level shift to convert from the power supply start-up control pulse STT1 with amplitude of VSS1-VDD1 to the power supply start-up control pulse STT1 with amplitude of VSS1-VDD2. As the level shifter 152, one having the circuit configuration shown in FIG. 2 can be used for example.

The −2.75 V generation circuit unit 23 includes a charge pump circuit 231, a level shifter 232, a buffer 233, a switch element 234, and a power supply start-up control circuit 235. The charge pump circuit 231 includes a flying capacitor C31 and a pair of transistors, i.e., a PchMOS transistor Qp31 and an NchMOS transistor Qn31. The PchMOS transistor Qp31 is connected between one end of the flying capacitor C31 and the power supply line L21 for the voltage VDD1, and the NchMOS transistor Qn31 is connected between the one end of the flying capacitor C31 and the power supply line L22 for the voltage VSS1.

In the charge pump circuit 231, a PchMOS transistor Qp32, which is a switching transistor, is connected between the other end of the flying capacitor C31 and the power supply line L22. In addition, an NchMOS transistor Qn32, which is a switching transistor, is connected between the other end of the flying capacitor C31 and an output line L26. The output line L26 is a line for outputting the second negative supply voltage VDD2. The gate of the MOS transistor Qp32 is connected to the anode of a diode D31. The cathode of the diode D31 is connected to the power supply line L22. The gate of the MOS transistor Qn32 is connected to the anode of a diode D32. The cathode of the diode D32 is connected to the power supply line L21. A capacitor C34 is connected between the output line L26 and the power supply line L22.

The level shifter 232 is an amplitude conversion circuit that employs as its operating voltage, the second positive supply voltage VDD2 supplied via the power supply line L24 and the second negative supply voltage VSS2 supplied from the −2.75 V generation circuit unit 23 via a power supply line L27. The level shifter 232 converts a control pulse having amplitude of VSS1-VDD1 to a control pulse having amplitude of VSS2-VDD2. Also as the level shifter 232, one having the circuit configuration shown in FIG. 5 can be used for example. The control pulse DDC with amplitude of VSS2-VDD2, which results from the amplitude conversion by the level shifter 232, is supplied via the buffer 233 to each of the gates of the MOS transistors Qp31 and Qn31, and is supplied via the capacitors C32 and C33 to the gates of the MOS transistors Qp32 and Qn32, respectively.

The buffer 223 is composed of two cascaded CMOS inverters. One inverter is composed of a PchMOS transistor Qp34 and an NchMOS transistor Qn34 that are connected in series between the power supply line L24 for the voltage VDD2 and the power supply line L27 for the voltage VSS2, and have gates connected to each other. The other inverter is composed of a PchMOS transistor Qp35 and an NchMOS transistor Qn35 that are connected in series between the power supply lines L24 and L27, and have gates connected to each other.

The switch element 234 is provided in order to couple the output line L26 to the power supply line L22 for the voltage VSS1 during a certain period at the time of power-up. The switch element 234 is made up of an NchMOS transistor Qn33 connected between the power supply line L25 and the output line L26. To the gate of the MOS transistor Qn33, the above-described power supply start-up control pulse STT2 is applied via the power supply start-up control circuit 235 at the time of power-up.

The power supply start-up control circuit 235 is provided in order to surely turn on the switch element 234 at the time of power-up, and to surely turn off the switch element 234 after the supply voltage VSS2 has been activated. The power supply start-up control circuit 235 includes a resistance element R12 and a level shifter 153 connected in parallel with the resistance element R12. The resistance element R12 directly supplies the power supply start-up control pulse STT2 to the gate of the MOS transistor Qp33. The level shifter 153 implements a level shift to convert from the power supply start-up control pulse STT2 with amplitude of VSS1-VDD1 to the power supply start-up control pulse STT2 with amplitude of VSS2-VDD1.

As the level shifter 153, one having the circuit configuration shown in FIG. 2 can be used for example. However, if a level shifter having the circuit configuration shown in FIG. 2 is used as the level shifter 153, in FIG. 2, VDD2, VDD1 and VSS1 need to replace VSS2, VSS1 and VDD1, respectively, and transistors of the opposite conductivity type need to replace all the NMOS and PMOS transistors.

Figure 6:
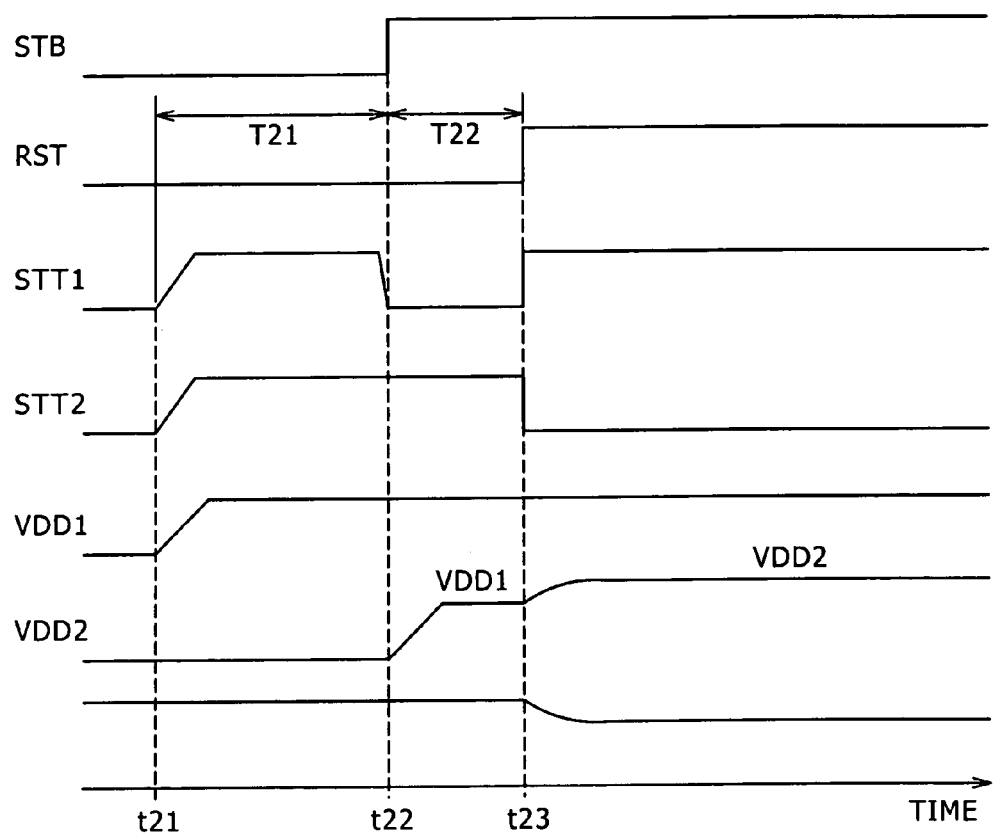
FIG. 6 is a timing chart explaining the circuit operation of the charge pump DC-DC converter according to the second embodiment at the time of power-up thereof.

The circuit operation of the charge pump DC-DC converter 20, at the time of power-up thereof, according to the second embodiment with the above-described configuration will be described below with reference to the timing chart of FIG. 6.

In the control circuit unit 21, two power supply start-up control pulses STT1 and STT2 are generated based on the reset pulse RST and the standby pulse STB, and the control pulse DDC is generated based on the standby pulse STB, the master clock MCK and the mode signal. In addition, the control pulse DDC is commonly applied to the 5.5 V generation circuit unit 22 and the −2.75 V generation circuit unit 23 as a pumping pulse, and the power supply start-up control pulses STT1 and STT2 are supplied to the 5.5 V generation circuit unit 22 and the −2.75 V generation circuit unit 23, respectively.

Upon power-up at time t21, initially the supply voltage VDD1 and the power supply start-up control pulses STT1 and STT2 are activated. During a certain period T21 from the activation to time t12, the standby pulse STB is at the low level (ground level), and therefore the MOS transistor Qn23 of the 5.5 V generation circuit unit 22 is in the on-state. Thus, charges of the capacitor C24 are discharged. Furthermore, the power supply start-up control pulse STT2 is activated, and is applied via the resistance element R12 to the gate of the MOS transistor Qn33. Thus, the MOS transistor Qn33 enters the on-state, which couples the output line L26 to the power supply line L22. Therefore, the negative supply voltage VSS1 is output from the output line L26 initially. The negative supply voltage VSS1 is also supplied to the level shifters 222 and 232 via the power supply lines L25 and L27.

At the time t22, the standby pulse STB is switched to the high level (VCC1), which turns off the MOS transistor Qn23. In addition, the power supply start-up control pulse STT1 is turned to and kept at the low level during a certain period T22, and is applied via the resistance element R11 to the gate of the MOS transistor Qp23. Thus, the MOS transistor Qp23 enters the on-state, which couples the output line L23 to the power supply line L21. Therefore, the positive supply voltage VDD1 is output from the output line L23 initially. The positive supply voltage VDD1 is also supplied to the level shifters 222 and 232 via the power supply line L24.

The level shifters 222 and 232 initialize operation with the positive supply voltage VDD1 and the negative supply voltage VSS1 as the supply voltage, and supply the control pulse with amplitude of VSS1-VDD1 directly to the charge pump circuits 221 and 231 via the buffers 223 and 233. Upon receiving the control pulse DDC, the charge pump circuits 221 and 231 initialize pumping operation according to the control pulse DDC.

Subsequently, at time t23, after the elapse of the certain period T22, the power supply start-up control pulse STT1 is turned to the high level and thus the MOS transistor Qp23 is turned off in the 5.5 V generation circuit unit 22. Thus, the pumping operation by the charge pump circuit 221 gradually raises the potential of the output line L23 from the VDD1 level, and ultimately the potential converges on the VDD2 level. The supply voltage VDD2 is supplied to the level shifters 222 and 232 via the power supply line L24.

Similarly, also in the −2.75 V generation circuit unit 23, the power supply start-up control pulse STT2 is turned to the low level at the time t23, and thus the MOS transistor Qn33 is turned off. Thus, the pumping operation by the charge pump circuit 231 gradually raises the potential of the output line L26 from the VSS1 level, and ultimately the potential converges on the VSS2 level. The supply voltage VSS2 is supplied to the level shifters 222 and 232 via the power supply lines L25 and L27.

Thus, the level shifter 222 implements amplitude conversion to convert from the control pulse DDC with amplitude of VSS1-VDD1 to the control pulse DDC with amplitude of VSS2-VDD2, and supplies the converted pulse to the charge pump circuit 221. Similarly, the level shifter 232 implements amplitude conversion to convert from the control pulse DDC with amplitude of VSS1-VDD1 to the control pulse DDC with amplitude of VSS2-VDD2, and supplies the converted pulse to the charge pump circuit 231.

In addition, the level shifter 152 implements amplitude conversion to convert from the power supply start-up control pulse STT1 with amplitude of VSS1-VDD1 to the power supply start-up control pulse STT1 with amplitude of VSS1-VDD2, and applies the converted pulse to the gate of the MOS transistor Qp23. Similarly, the level shifter 153 implements amplitude conversion to convert from the power supply start-up control pulse STT2 with amplitude of VSS1-VDD1 to the power supply start-up control pulse STT2 with amplitude of VSS2-VDD1, and applies the converted pulse to the gate of the MOS transistor Qn33.

As describe above, the charge pump DC-DC converter 20 according to the second embodiment that converts the supply voltage VDD1 to the supply voltages VDD2 and VSS2 can achieve the same advantages as those of the charge pump DC-DC converter 10 according to the first embodiment, by implementing pumping operation with the control pulse DDC having a converted amplitude as a pumping pulse. In particular, the second embodiment can achieve more excellent advantages since it has a configuration in which the supply voltage VSS2 generated by the −2.75 V generation circuit unit 23 is supplied to the level shifter 222 of the 5.5 V generation circuit unit 22, and the supply voltage VDD2 generated by the 5.5 V generation circuit unit 22 is supplied to the level shifter 232 of the −2.75 V generation circuit unit 23.

Specifically, the above-described configuration allows larger amplitude of the control pulse DDC supplied to the charge pump circuits 221 and 231 compared with the first embodiment. More specifically, the second embodiment obtains the control pulse with amplitude of VSS2-VDD2 in contrast to the first embodiment, which obtains the control pulse with amplitude of VSS1-VDD2. Therefore, the MOS transistors Qp21, Qn21, Qn22, Qp22, Qp31, Qn31, Qn32 and Qp32 can be further miniaturized compared with the MOS transistors Qp11, Qn11, Qn12 and Qp12 of the first embodiment. Thus, the charge pump circuit 20 having a large current capability can be achieved with a smaller circuit scale.

APPLICATION EXAMPLE

Figure 7:
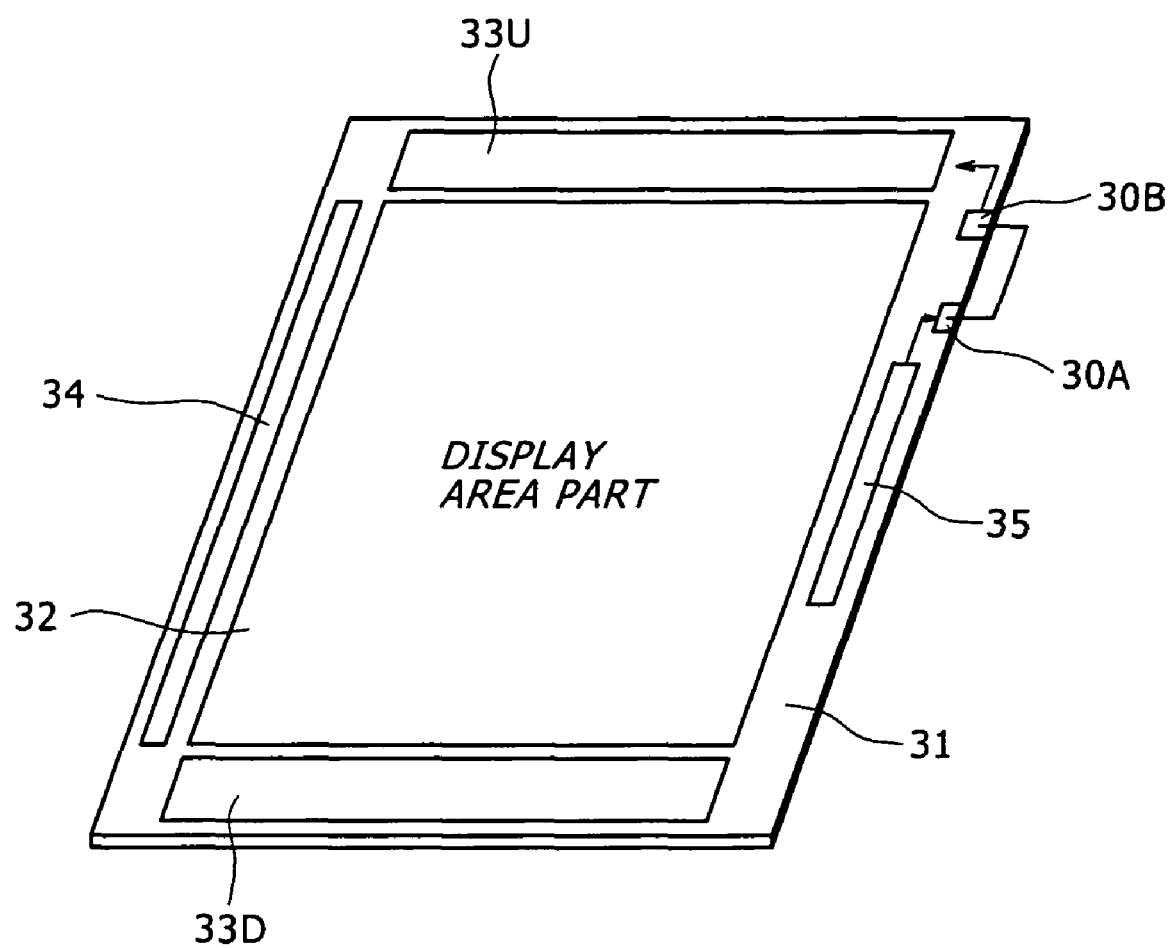
FIG. 7 is a schematic configuration diagram illustrating an example of the configuration of a liquid crystal display according to the present invention.

Charge pump DC-DC converters (supply voltage conversion circuits) according to the above-described embodiments are used as, e.g., a power supply circuit of a flat-panel display typified by liquid crystal displays in which pixels that employ liquid crystal cells as electro-optical elements are two-dimensionally arranged in rows and columns. FIG. 7 illustrates one example of the configuration thereof. Here, description will be made by taking as an example an active matrix liquid crystal display.

Referring to FIG. 7, mounted on a transparent insulating substrate, e.g., a glass substrate 31 are a display area part 32 in which a number of pixels including liquid crystal cells are two-dimensionally arranged in rows and columns, a pair of upside and downside H drivers (horizontal drive circuits) 33U and 33D, a V driver (vertical drive circuit) 34, and a supply voltage conversion circuit 35. As the supply voltage conversion circuit 35, a charge pump DC-DC converter according to any of the above-described embodiments is used. Although the supply voltage circuit may be disposed on any place on the transparent insulating substrate, it is preferable to dispose it near a signal coupling terminal to the external.

The glass substrate 31 is composed of a first substrate in which a number of pixel circuits including active elements (e.g., transistors) are disposed in a matrix, and a second substrate disposed facing the first substrate with a certain gap therebetween. A liquid crystal is enclosed between the first and second substrates to thereby form a liquid crystal panel (display panel).

Figure 8:
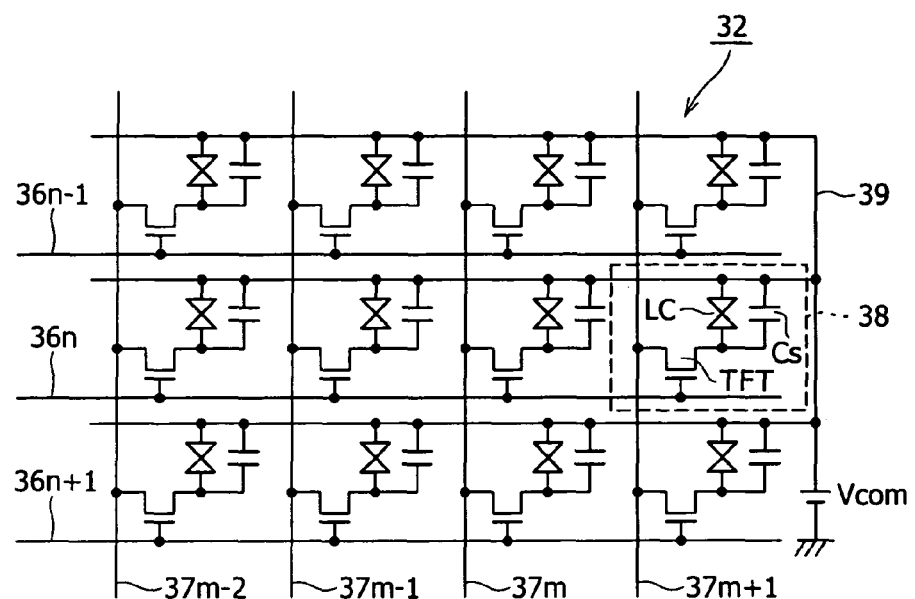
FIG. 8 is a circuit diagram illustrating an example of the configuration of a display area part of the liquid crystal display.

FIG. 8 illustrates one example of the specific configuration of the display area part 32. Here, for simplification of the drawing, description will be made by taking as an example pixel arrangement of three rows ((n−1)th row to (n+1)th row) and four columns ((m−2)th column to (m+1)th column). Referring to FIG. 8, wired on the display area part 32 are vertical scan lines . . . , 36n−1, 36n, 36n+1, . . . and data lines (signal lines) . . . , 37m−2, 37m−1, 37m, 37m+1, . . . . Unit pixels 38 are disposed at intersections between these lines. The unit pixel 38 includes a thin film transistor TFT that is a pixel transistor, a liquid crystal cell LC and a storage capacitor Cs. The liquid crystal cell LC means capacitance generated between a pixel electrode formed of the thin film transistor TFT and a counter electrode facing the pixel electrode.

The gate electrodes of the thin film transistors TFT are connected to the vertical scan lines . . . , 36n−1, 36n, 36n+1, . . . . The source electrodes thereof are connected to the data lines . . . , 37m−2, 37m−1, 37m, 37m+1, . . . . As for the liquid crystal cell LC, the pixel electrode is connected to the drain electrode of the thin film transistor TFT, and the counter electrode is connected to a common line 39. The storage capacitor Cs is connected between the drain electrode of the thin film transistor TFT and the common line 39. The common line 39 is supplied with a certain DC voltage as a common voltage Vcom.

One end of each of the vertical scan lines . . . , 36n−1, 36n, 36n+1, . . . is connected to an output terminal of a corresponding row of the V driver 34 shown in FIG. 7. The V driver 34 is made up of a shift register for example. The V driver 34 sequentially generates vertical selection pulses and supplies the pulses to the vertical scan lines . . . , 36n−1, 36n, 36n+1, . . . in sync with a vertical transfer clock VCK (not shown) to thereby implement vertical scanning. In contrast, in the display area part 32, for example, one end of each of the odd-numbered data lines . . . , 37m−1, 37m+1, . . . is connected to an output terminal of a corresponding column of the H driver 33U shown in FIG. 7. In addition, one end of each of the even-numbered data lines . . . , 37m−2, 37m, . . . is connected to an output terminal of a corresponding column of the H driver 33D shown in FIG. 7.

In the active matrix liquid crystal display with the above-described configuration, the supply voltage conversion circuit 35, to which a charge pump DC-DC converter according to any of the above-described embodiments is applied, is integrated on the glass substrate 31 that is the same as the substrate on which the display area part 32 is integrated. Here, the display area part 32 employs the thin film transistor TFT as each pixel transistor. Therefore, if thin film transistors are also used as the transistors included in the supply voltage conversion circuit 35 and at least these transistor circuits are formed in the same process as that for the display area part 32, the conversion circuit 35 can be fabricated easily at low costs in the integration thereof.

In addition, when forming the supply voltage conversion circuit 35 on the glass substrate 31 integrally with peripheral drive circuits such as the H drives 33U and 33D and the V drive 34, it is advantageous in terms of the productivity to provide a power supply output terminal 30A for extracting to the outside of the substrate a supply voltage generated by the supply voltage conversion circuit 35, and a power supply input terminal 30B for bringing in the inside of the substrate the supply voltage that has been extracted to the outside and supplying the voltage to each circuit part, and to electrically couple the terminals 30A and 30B outside the substrate. This is because the provision of these terminals allows each circuit in the supply voltage conversion circuit 35 to be checked through the power supply output terminal 30A.

In the above-described application example, a charge pump DC-DC converter according to any of the above-described embodiments as the supply voltage conversion circuit 35 is formed on the glass substrate 31 integrally with the display area part 32. However, the DC-DC converter does not necessarily need to be formed integrally with the display area part 32. The DC-DC converter may be used as an external circuit of the liquid crystal display. Furthermore, it may be formed not on the glass substrate 31 but on another substrate. However, it should be obvious that integral forming on the same substrate as that of the display area part 32 is more advantageous for the above-described reason.

Furthermore, a charge pump DC-DC converter according to any of the above-described embodiments can achieve large current capacitance with a small circuit scale. This advantage is extremely significant particularly when using transistors having large threshold values Vth such as thin film transistors. Therefore, forming the DC-DC converter as the supply voltage conversion circuit 35 integrally with the display area part 32 on the same substrate can significantly contribute to cost reduction, thickness reduction and saving of unnecessary spaces of a set including a liquid crystal display.

Application of the present invention is not limited to liquid crystal displays. The invention can also be applied to other active matrix displays, such as electroluminescence (EL) displays employing an EL element as an electro-optical element of each pixel, in a similar way.

Furthermore, a display according to the present invention is used as a display of OA apparatuses typified by personal computers and word processors, and television receivers. In addition, the display is preferably used for a screen display part of portable terminals, such as cellular phones and PDAs, in which miniaturization and saving of unnecessary spaces of the device main body have been advancing in particular.

Figure 9:
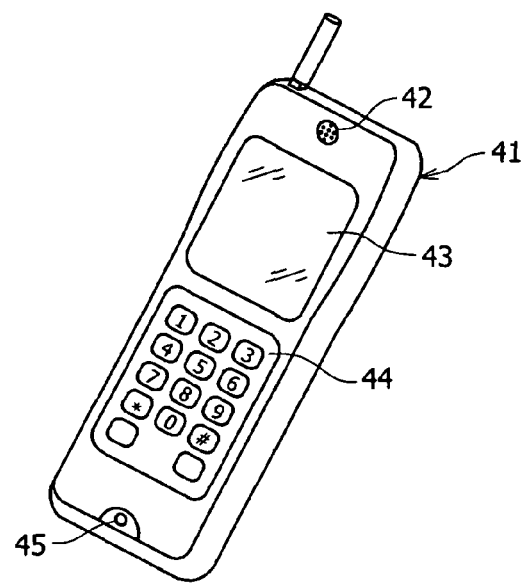
FIG. 9 is an outline view illustrating the schematic configuration of a cellular phone that is a portable terminal according to the present invention.

FIG. 9 is an outside drawing illustrating the schematic configuration of a portable terminal, e.g., a cellular phone to which the present invention is applied.

The cellular phone according to this example has a configuration in which a speaker 42, a screen display part 43, an operation part 44 and a microphone 45 are disposed on the front side of a device case 41 in that order from the upper side of the phone. In the cellular phone with such a configuration, a liquid crystal display is used for the display part 43 for example, and as the liquid crystal display, one having a DC-DC converter (supply voltage conversion circuit) according to any of the above-described embodiments is used.

If a liquid crystal display having a DC-DC converter according to any of the above-described embodiments is thus used for the screen display part 43 in portable terminals such as cellular phones and PDAs, there arises an advantage of significantly contributing to reduction of power consumption of the portable terminal, and miniaturization and saving of unnecessary spaces of the device main body since the supply voltage conversion circuit can achieve large current capacity with a small circuit scale.

As described above, according to the present invention, in a charge pump supply voltage conversion circuit, the amplitude of a control pulse is converted using a converted supply voltage and the control pulse having the converted amplitude is used as a pumping pulse to thereby charge/discharge a capacitor. Thus, the voltages between the gate and source of a transistor pair for charging/discharging the capacitor are increased, which allows the transistor sizes of the transistor pair to be designed smaller. Therefore, a supply voltage conversion circuit having a large current capability can be achieved with a small circuit scale.

The invention claimed is:

1. A supply voltage conversion circuit comprising:
   a charge pump circuit that includes a capacitor and a pair of transistors for charging/discharging said capacitor, and converts a first supply voltage to a second supply voltage that is larger than the first supply voltage;
   an amplitude conversion circuit that converts amplitude of a control pulse for driving said pair of transistors by using said second supply voltage output from said charge pump circuit and input into said amplitude conversion circuit, said output second supply voltage resulting from conversion by said charge pump circuit; and
   a buffer circuit directly connected between the charge pump circuit and the amplitude conversion circuit.

2. The supply voltage conversion circuit according to claim 1, further comprising:
   a switch element that couples an output line of said charge pump circuit to a power supply line for said first supply voltage during a certain period at the time of power-up.

3. The supply voltage conversion circuit according to claim 2, further comprising:
   a resistance element that applies to a gate of said switch element a controlling pulse supplied at the time of power-up; and
   a level shift circuit that is connected in parallel with said resistance element and shifts a level of said controlling pulse by using said second supply voltage resulting from conversion by said charge pump circuit.

4. A method of controlling a supply voltage conversion circuit employing a charge pump circuit that includes a capacitor and a pair of transistors for charging/discharging the capacitor, the charge pump circuit converting a first supply voltage to a second supply voltage that is larger than the first supply voltage, said method comprising:
   converting, using a amplitude conversion circuit, amplitude of a control pulse by using said second supply voltage output from said charge pump circuit and input into said amplitude conversion circuit, said output second supply voltage resulting from conversion by said charge pump circuit and said amplitude conversion circuit directly connected to the change pump circuit via a buffer circuit; and
   charging/discharging said capacitor with said pair of transistors by using the control pulse having the converted amplitude.

5. A display including a display area part in which pixels having an electro-optical element are two-dimensionally arranged in rows and columns, and a supply voltage conversion circuit that converts a certain direct current supply voltage to a supply voltage having a different voltage value, said supply voltage conversion circuit comprising:
   a charge pump circuit that includes a capacitor and a pair of transistors for charging/discharging said capacitor, and converts a first supply voltage to a second supply voltage that is larger than the first supply voltage;
   an amplitude conversion circuit that converts amplitude of a control pulse for driving said pair of transistors by using said second supply voltage output from said charge pump circuit and input into said amplitude conversion circuit, said output second supply voltage resulting from conversion by said charge pump circuit; and
   a buffer circuit directly connected between the charge pump circuit and the amplitude conversion circuit.

6. The display according to claim 5, further comprising:
   a switch element that couples an output line of said charge pump circuit to a power supply line for said first supply voltage during a certain period at the time of power-up.

7. The display according to claim 6, further comprising:
   a resistance element that applies to a gate of said switch element a controlling pulse supplied at the time of power-up; and
   a level shift circuit that is connected in parallel with said resistance element and shifts a level of said controlling pulse by using said second supply voltage resulting from conversion by said charge pump circuit.

8. The display according to claim 5, wherein said supply voltage conversion circuit is formed on a transparent insulating substrate that is the same as a substrate on which said display area part is formed.

9. The display according to claim 8, further comprising:
   a power supply output terminal for extracting to the outside of the substrate a supply voltage output from said supply voltage conversion circuit; and
   a power supply input terminal for bringing in the inside of the substrate the supply voltage output from said power supply output terminal, said power supply output terminal and said power supply input terminal being electrically coupled to each other outside the substrate.

10. A portable terminal employing as a screen display part a display that has a supply voltage conversion circuit, the supply voltage conversion circuit comprising:
    a charge pump circuit that includes a capacitor and a first pair of transistors for charging/discharging said capacitor, and converts a first supply voltage to a second supply voltage that is larger than the first supply voltage;
    an amplitude conversion circuit that converts amplitude of a control pulse for driving said pair of transistors by using said second supply voltage output from said charge pump circuit and input into said amplitude conversion circuit, said output second supply voltage resulting from conversion by said charge pump circuit; and
    a buffer circuit directly connected between the charge pump circuit and the amplitude conversion circuit.

11. The portable terminal according to claim 10, further comprising:
    a switch element that couples an output line of said charge pump circuit to a power supply line for said first supply voltage during a certain period at the time of power-up.

12. The portable terminal according to claim 11, further comprising:
    a resistance element that applies to a gate of said switch element a controlling pulse supplied at the time of power-up; and
    a level shift circuit that is connected in parallel with said resistance element and shifts a level of said controlling pulse by using said second supply voltage resulting from conversion by said charge pump circuit.

13. The display according to claim 10, wherein said supply voltage conversion circuit is formed on a transparent insulating substrate that is the same as a substrate on which a display area part of said screen display part is formed.

14. A supply voltage conversion circuit comprising:
    a charge pump circuit that includes a capacitor and a pair of transistors for charging/discharging said capacitor, and converts a first supply voltage to a second supply voltage that is larger than the first supply voltage;
    an amplitude conversion circuit that converts amplitude of a control pulse for driving said pair of transistors by using said second supply voltage output from said charge pump circuit and input into said amplitude conversion circuit, said output second supply voltage resulting from conversion by said charge pump circuit; and
    a power supply startup control circuit configured to bypass the charge pump circuit for a predetermined time after power-up by coupling an output line, connected to the amplitude conversion circuit, to a power supply line initially having the first supply voltage.

* * * * *